(12) United States Patent
Cheng (10) Patent No.: US 10,623,539 B2
(45) Date of Patent: Apr. 14, 2020

(54) MOBILE TERMINAL

(71) Applicant: GUANGDONG OPPO MOBILE TELECOMMUNICATIONS CORP., LTD., Dongguan, Guangdong (CN)

(72) Inventor: Jiao Cheng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/184,394

(22) Filed: Nov. 8, 2018

(65) Prior Publication Data

US 2019/0253535 A1    Aug. 15, 2019

(30) Foreign Application Priority Data

Feb. 9, 2018   (CN) .................... 2018 2 0236855 U (51) Int. Cl.
*H04M 1/00*   (2006.01)
*H04M 1/02*   (2006.01)
*H02K 7/116*  (2006.01)

(52) U.S. Cl.
CPC .......... *H04M 1/0233* (2013.01); *H02K 7/116* (2013.01); *H04M 1/0227* (2013.01); *H04M 1/0264* (2013.01); *H04M 1/0266* (2013.01)

(58) Field of Classification Search
CPC combination set(s) only.
See application file for complete search history.

(56) References Cited

U.S. PATENT DOCUMENTS

| | | |
|---|---|---|
| 2005/0090298 A1 | 4/2005 | Park |
| 2005/0266898 A1 | 12/2005 | Ahn |
| 2005/0288075 A1 | 12/2005 | Geernaert |
| 2006/0121959 A1* | 6/2006 | Cha .................... H04M 1/0247 455/575.1 |

(Continued)

FOREIGN PATENT DOCUMENTS

| | | |
|---|---|---|
| CN | 101637011 A | 1/2010 |
| CN | 102880245 A | 1/2013 |

(Continued)

OTHER PUBLICATIONS

International Search Report in the international application No. PCT/CN2018/116785, dated Jan. 31, 2019.

(Continued)

*Primary Examiner* — Md K Talukder
(74) *Attorney, Agent, or Firm* — Ladas & Parry LLP (57) ABSTRACT

A mobile terminal includes a body, a display screen and a functional assembly. The body includes a first surface and a second surface arranged opposite to each other. The screen is arranged on the body and located at one side of the first surface. The device includes a rotating block rotatably arranged on the second surface and a camera located on the block. The block can be rotated through a first position and a second position relative to the body. At the first position, edges of the block are aligned with those of the body. The camera is located in a positive projection area of the screen on a rotating plane of the block. At the second position, the edges of the block are staggered with those of the body. The camera is located out of the positive projection area of the screen on the rotating plane of the block.

11 Claims, 4 Drawing Sheets

(56) References Cited

U.S. PATENT DOCUMENTS

| | | | |
|---|---|---|---|
| 2008/0004083 A1* | 1/2008 | Ohki | H04M 1/0212 |
| | | | 455/566 |
| 2008/0207272 A1 | 8/2008 | Thornton | |
| 2011/0274422 A1* | 11/2011 | Lin | G03B 17/02 |
| | | | 396/439 |
| 2012/0281380 A1 | 11/2012 | Werner | |
| 2013/0150122 A1* | 6/2013 | Kulas | H04M 1/0264 |
| | | | 455/556.1 |
| 2015/0323962 A1 | 11/2015 | Werner et al. | |
| 2015/0377323 A1* | 12/2015 | Koike | F16H 1/46 |
| | | | 475/149 |
| 2016/0054756 A1* | 2/2016 | Lan | G03B 21/145 |
| | | | 353/101 |
| 2016/0127620 A1* | 5/2016 | Lee | H04N 5/2254 |
| | | | 348/373 |
| 2016/0374212 A1* | 12/2016 | Gao | H01R 35/04 |
| 2017/0031385 A1 | 2/2017 | Werner et al. | |
| 2017/0171455 A1* | 6/2017 | Isonaga | G03B 17/566 |
| 2017/0223158 A1* | 8/2017 | Yin | H04M 1/02 |
| 2017/0366652 A1* | 12/2017 | Boerckel | H04M 1/72527 |
| 2018/0292862 A1 | 10/2018 | Werner et al. | |
| 2019/0079614 A1* | 3/2019 | Maalouf | G06F 3/0412 |
| 2019/0215389 A1* | 7/2019 | Yin | G06F 1/1686 |

FOREIGN PATENT DOCUMENTS

| | | |
|---|---|---|
| CN | 204216938 U | 3/2015 |
| CN | 208063255 U | 11/2018 |
| GB | 2375683 A | 11/2002 |
| WO | 2005114807 A1 | 12/2005 |
| WO | 2006008588 A1 | 1/2006 |
| WO | 20060412383 A1 | 4/2006 |
| WO | 2010035307 A1 | 4/2010 |

OTHER PUBLICATIONS

Supplementary European Search Report in the European application No. 18207198.5, dated Apr. 29, 2019.

* cited by examiner

MOBILE TERMINAL

TECHNICAL FIELD

The present disclosure relates to the technical field of mobile terminals, and in particular to a mobile terminal.

BACKGROUND

At present, a mobile terminal such as an intelligent mobile phone is equipped with a front camera for providing functions such as a video call and a selfie. The front camera needs to occupy a partial space of a panel of the mobile terminal, which results in that an area for displaying on the panel of the mobile terminal is reduced relatively and thus is not beneficial to implementing the high screen-to-body ratio pursued at present.

SUMMARY

Embodiments of the disclosure provide a mobile terminal including a body, a display screen and a functional assembly.

The body includes a first surface and a second surface arranged opposite to the first surface.

The display screen is arranged on the body and located at one side of the first surface.

The functional assembly includes a rotating block rotatably arranged on the second surface and a camera located on the rotating block. The rotating block is capable of being rotated through a first position and a second position relative to the body. The camera is provided with a light entering surface. When the rotating block is at the first position, the periphery of the rotating block is aligned with that of the body, and the light entering surface is located in positive projection areas of both the display screen and the body on a rotating plane of the rotating block so as to be sheltered by the body and the display screen. When the rotating block is at the second position, edges of the rotating block are staggered with edges of the body, and the light entering surface is located out of the positive projection areas of both the display screen and the body on the rotating plane of the rotating block so as to be exposed out of the body.

Embodiments of the disclosure also provide another mobile terminal including a body, a display screen and a functional assembly.

The body includes a first surface and a second surface arranged opposite to the first surface.

The display screen is arranged on the body and located at one side of the first surface.

The functional assembly comprises a rotating block rotatably arranged on the second surface, a camera and a telephone receiver. The camera and the Telephone receiver are located on the rotating block. The rotating block is capable of being rotated through a first position and a second position relative to the body. The camera is provided with a light entering surface, and the telephone receiver is provided with a sound outlet. When the rotating block is at the first position, the light entering surface and the sound outlet are sheltered by the body and the display screen. When the rotating block is at the second position, the light entering surface and the sound outlet are exposed out of the body.

DETAILED DESCRIPTION

In order to understand the present disclosure conveniently, the present disclosure will be described more comprehensively with reference to relevant accompanying drawings. Preferred embodiments of the disclosure are given in the accompanying drawings. However, the disclosure may be implemented in many different forms and is not limited to the embodiments described herein. On the contrary, providing these embodiments is to understand the disclosed content of the disclosure more thoroughly and comprehensively.

It is to be noted that, when an element is referred to as being "fixed on" another element, it may be directly on the other element or intervening elements may be present. When an element is referred to as being "connected to" another element, it may be directly connected to the other element or intervening elements may be present simultaneously.

Figure 1:
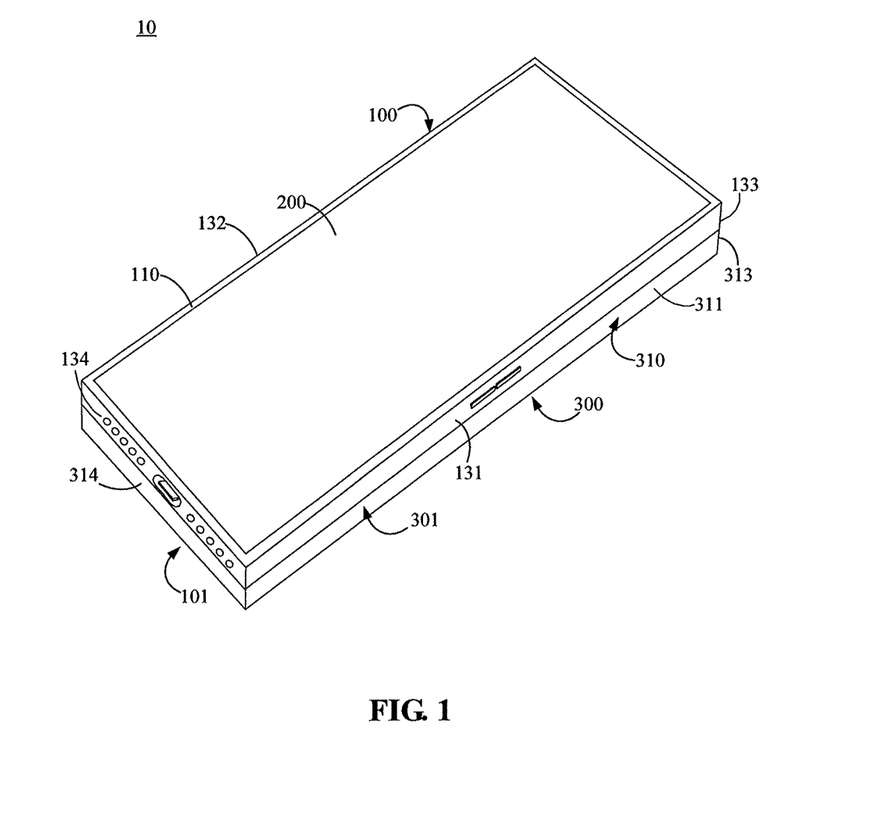
FIG. 1 illustrates a stereoscopic structural schematic diagram in which a rotating block is located at a first position in a mobile terminal provided by an embodiment.
Figure 2:
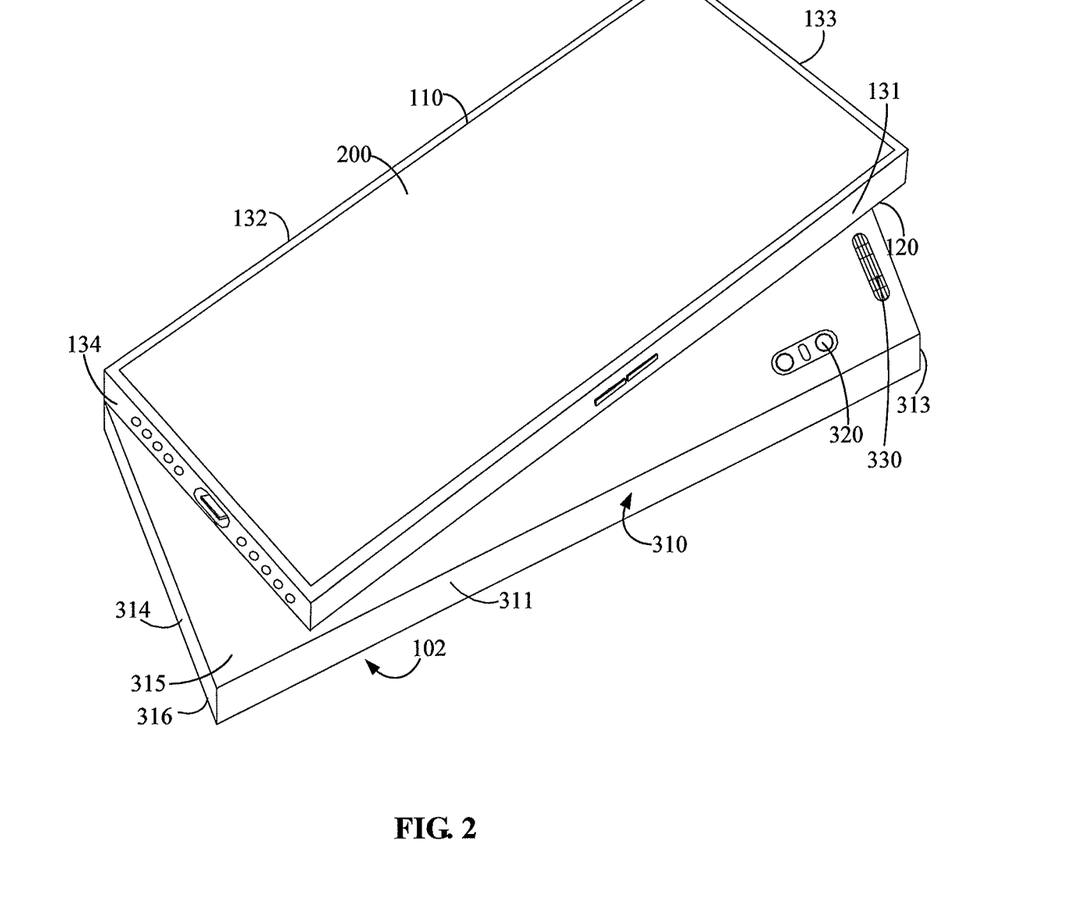
FIG. 2 illustrates a stereoscopic structural schematic diagram in which a rotating block is located at a second position in a mobile terminal provided by an embodiment.
Figure 3:
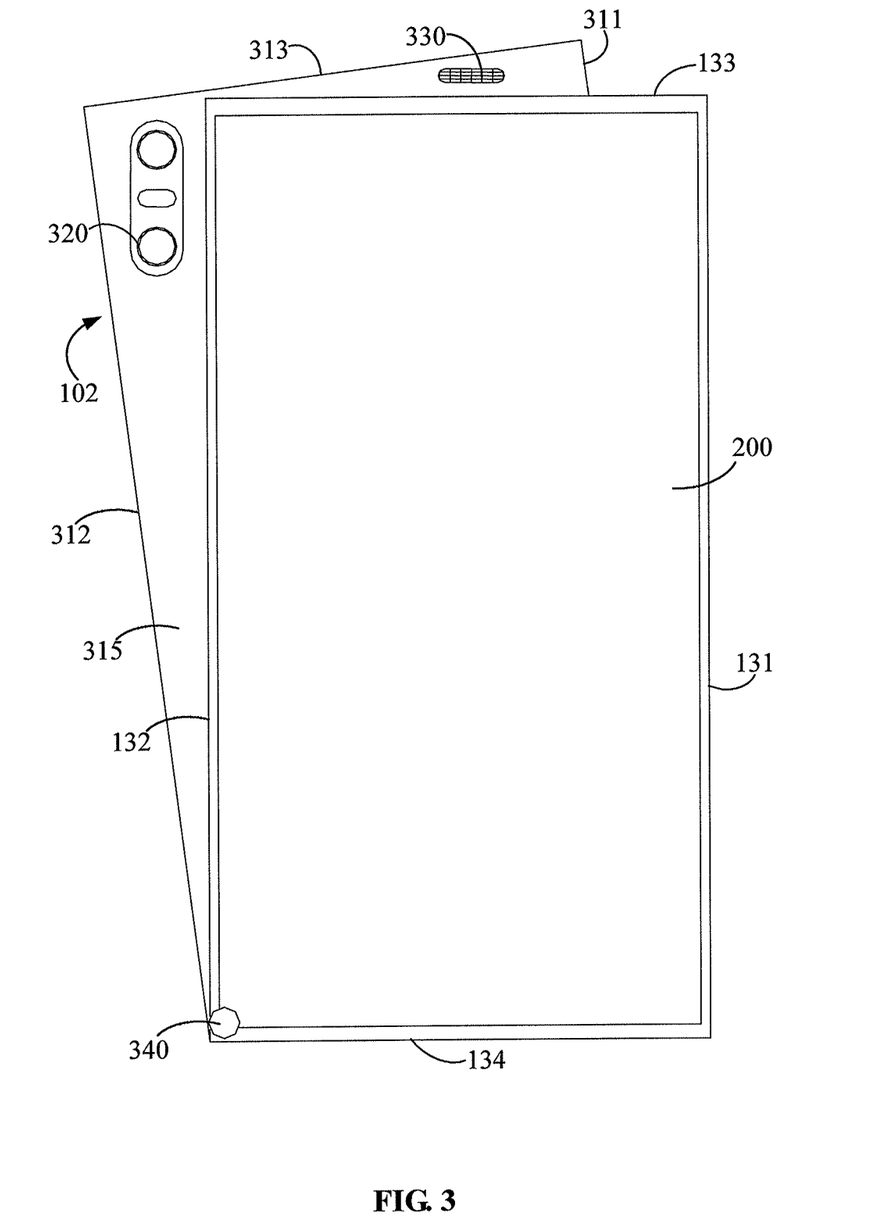
FIG. 3 illustrates a planar structural schematic diagram in which a rotating block is located at a second position in a mobile terminal provided by an embodiment.

As illustrated in FIG. 1 to FIG. 3, a mobile terminal 10 includes a body 100, a display screen 200 and a functional assembly 300. The body 100 is an assembly carrier of the display screen 200 and the functional assembly 300. The display screen 200 and the body 100 are formed into a fixed connection. The functional assembly 300 is rotatably arranged on the body 100. The body 100 may be made of a metal material, for instance, it may be aluminum, an aluminum alloy or a stainless steel, etc. The body 100 includes a first surface 110 and a second surface 120 arranged opposite to the first surface 110, as well as a side circumference 130 connected to the first surface 110 and the second surface 120, in which the opposite arrangement may also be understood as the reverse arrangement. It is assumed that a certain position on the thickness direction of the side circumference 130 is defined to be parallel to a plane where the display screen 200 is located, all positions on the first surface 110 may be located at one side of the plane, and all positions on the second surface 120 may be located on the other opposite side of the plane. The display screen 200 is loaded at one side of the first surface 110 of the body 100. One side of the first surface 110 of the body 100 may be sunken inward to form a holding cavity, so that the first surface 110 of the body 100 finally appears to be non-planar and is a combination having multiple step faces. The edges of the display screen 200 may be carried on one step face. The outer surface of the display screen 200 may be aligned with a step face at the highest place of the first surface 110, and may also be slightly protruded from the step face at the highest place of the first surface 110. The display screen 200 is at least partially placed in the holding cavity formed by the body 100 on the thickness direction. The holding cavity formed on the body 100 may further be configured to place other components of the mobile terminal 10, such as a control module and a power module. In order to place other components, structures such as a bump and a plate may further be formed in the holding cavity. Whatever the specific form of the structure in the holding cavity is, the portion arranged opposite to the second surface 120 on the body 100 belongs to one part of the first surface 110 of the body 100.

In some embodiments, the body 100 may include a middle frame. Two opposite end surfaces of the middle frame are the first surface 110 and the second surface 120, and the outer wall surface of the middle frame is the side circumference 130. The middle frame is enclosed to form the holding cavity. The display screen 200 is combined with one end surface of the middle frame, and the display screen 200 is at least partially located in the holding cavity on the thickness direction. A plate connected with the inner wall surface of the middle frame and configured to carry other components of the mobile terminal 10 such as the control module and the power module may be arranged inside the middle frame. In some embodiments, the body 100 may further include a rear cover. The rear cover is combined with the other end surface of the middle frame, so as to seal the holding cavity at one side of the second surface 120 of the body 100 and enable the outer surface of the rear cover to form the second surface 120 of the body 100. The second surface 120 may be present as a plane, may further be present as a curved surface, or may further be present as a plane mostly with a part protruded to form a convex structure.

A structure such as a groove and a hole is formed on the side circumference 130 of the body 100, so as to assemble an element for implementing a special function, or enable a peripheral element for implementing a special element to form a detachable connection with the mobile terminal 10, or take as a channel for inputting and outputting a signal such as a sound. The body 100 is of a rectangular blocky shape, and the cross section of the side circumference 130 may be of a linear shape or a curved shape. The side circumference 130 includes a first side circumference 131, a second side circumference 132, a third side circumference 133 and a fourth side circumference 134. The first side circumference 131 and the second side circumference 132 are arranged opposite to each other. The third side circumference 133 and the fourth side circumference 134 are arranged opposite to each other. The third side circumference 133 is connected with an end of each of the first side circumference 131 and the second side circumference 132, and the fourth side circumference 134 is connected with another end of each of the first side circumference 131 and the second side circumference 132. In brief, the four side circumferences may be connected in a closed loop to form a rounded rectangular outline. In other embodiments, the outline of the side circumference 130 may also be of other shapes such as a right-angled rectangular shape or a circular shape. The first side circumference 131 may be provided with a power key and a volume key. Through operations on the power key, functions such as lighting the display screen 200 of the mobile terminal 10 may be implemented. By operating the volume control key, functions such as adjusting a volume playing size of audio information of the mobile terminal 10 may be implemented. The fourth side circumference 134 may be provided with a connection port, e.g. one or more of a USB (Universal Serial Bus) interface and a headphone jack.

The display screen 200 forms an electrical connection with the functional assembly 300 and the control module, etc., and is configured to display information. In one embodiment, the display screen 200 is a touch display screen 200 and a user operates the information displayed by the display screen 200 via a touch operation manner. The diagonal lines of the display screen 200 are 4-8 inches long. Further, the ratio of the area of the display screen 200 for displaying to the area of the second surface 120 of the body 100 is not lower than 85%. If the ratio of the area of the display screen 200 to the area of the second surface 120 of the body 100 is relatively large, it is intuitively displayed that the distance of each edge of the display screen 200 to the side circumference 130 of the body 100 is relatively small so that the display screen 200 nearly covers all areas at one side of the first surface 110 of the body 100.

The functional assembly 300 may include a rotating block 310, a camera 320 and a telephone receiver. The telephone receiver is a headset 330. The rotating block 310 is rotatably arranged on the second surface 120. The camera 320 and the headset 330 are mounted on the rotating block 310. The rotating block 310 is slid relative to the body 100 in a special rotary plane, that is, the rotating block 310 may be rotated from the first position 101 to the second position 102. When the rotating block 310 is located at the first position 101, the edges of the rotating block 310 are aligned with the edges of the body 100. It may be understood that the positive projection of the rotating block 310 on the body 100 is rightly overlapped with an area where the body 100 is located, and the camera 320 and the headset 330 are located in a positive projection area of the display screen 200 on the rotary plane of the rotating block 310. It may also be understood that the headset 330 and the camera 320 both are located in an area where the second surface 120 is located. At this moment, due to the shelter of the display screen 200 and the body 100, when the observation is from one side of the first surface 110 to the display screen 200, a naked eye cannot observe the camera 320 and the headset 330, that is, the naked eye cannot observe the light entering surface of the camera 320. When the rotating block 310 is located at the second position 102, the edges of the rotating block 310 are staggered with those of the body 100, and it may be understood that the positive projection of the rotating block 310 on the body 100 is overlapped with a part of the area where the body 100 is located. The camera 320 and the headset 330 are located out of the positive projection area of the display screen 200 on the rotating plane of the rotating block 310, and it may also be intuitively understood that the camera 320 and the headset 330 both are located out of the area where the second surface 120 is located. At this moment, the display screen 200 and the body 100 will not form the sheltering effect to the camera 320 and the headset 330. When the observation is from one side of the first surface 110 to the display screen 200, the naked eye may observe the headset 330 and the camera 320, the camera 320 may shoot a scene located at one side of the display screen 200 and is also convenient for a human ear to contact the headset 330, and the human ear can smoothly receive a sound signal of the mobile terminal 10 via the headset 330.

In some embodiments, the thickness of the rotating block 310 is smaller than or equal to that of the body 100. In this way, the thickness of the whole mobile terminal 10 may be reduced as much as possible, which meets the development trend of thinning of the mobile terminal 10. Moreover, the rotating block 310 is relatively light and handy, which is beneficial to guaranteeing the rotation stability of the rotating block 310.

Under a condition in which the side circumference 130 is of the right-angled rectangle or the rounded rectangle, the length of the first side circumference 131 is equal to that of the second side circumference 132, the length of the third side circumference 133 is equal to that of the fourth side circumference 134, and the length of the first side circumference 131 is greater than that of the third side circumference 133. At this moment, the first side circumference 131 and the second side circumference 132 may be marked as a long edge of the body 100, and the third side circumference 133 and the fourth side circumference 134 may be marked as a short edge of the body 100. As illustrated in FIG. 2, when the rotating block 310 is rotated from the first position 101 to the second position 102 clockwise, the camera 320 and the headset 330 are exposed from the first side circumference 131 (namely, the long edge of the body 100) to be out of the area where the second surface 120 is located. Of course, the camera 320 and the headset 330 may also be exposed from the fourth side circumference 134 (namely, the short edge of the body 100) to be out of the area where the second surface 120 is located. As illustrated in FIG. 3, when the rotating block 310 is rotated from the first position 101 to the second position 102 counterclockwise, the camera 320 and the headset 330 are exposed from the second side circumference 132 (namely, the long edge of the body 100) to be out of the area where the second surface 120 is located. Of course, the camera 320 and the headset 330 may also be exposed from the third side circumference 133 (namely, the short edge of the body 100) to be out of the area where the second surface 120 is located.

The rotating block 310 includes an inner surface 315, an outer surface 316, and an outer circumference 301. The inner surface 315 and the outer surface 316 are arranged opposite to each other. The inner surface 315 is closer to the second surface 120 relative to the outer surface 316. The outer circumference 301 includes a first outer circumference 311, a second outer circumference 312, a third outer circumference 313 and a fourth outer circumference 314. The first outer circumference 311 and the second outer circumference 312 are arranged opposite to each other, and the third outer circumference 313 and the fourth outer circumference 314 are arranged opposite to each other. The third outer circumference 313 is connected with an end of each of the first outer circumference 311 and the second outer circumference 312, and the fourth outer circumference 314 is connected with another end of each of the first outer circumference 311 and the second outer circumference 312. The whole outer circumference 301 may be enclosed into a rounded rectangular or right-angled rectangular outline.

As illustrated in FIG. 2 and FIG. 3, when the rotating block 310 is at the first position 101, the first outer circumference 311 is aligned with the first side circumference 131, the second outer circumference 312 is aligned with the second side circumference 132, the third outer circumference 313 is aligned with the third side circumference 133 and the fourth outer circumference 314 is aligned with the fourth side circumference 134. That is, the outer circumference 301 of the rotating block 310 is aligned with the side circumference 130 of the body 100. When the rotating block 310 is at the second position 102, the outer circumference 301 of the rotating block 310 is staggered with the side circumference 130 of the body 100. For example, when the rotating block 310 is rotated clockwise, the first outer circumference 311 and the fourth outer circumference 314 both are located out of the area where the second surface 120 is located, and a part of the third outer circumference 313 and all of the second outer circumference 312 are located in the area where the second surface 120 is located. Also for example, when the rotating block 310 is rotated counterclockwise, the second outer circumference 312 and the third outer circumference 313 both are located out of the area where the second surface 120 is located, and a part of the first outer circumference 311 and all of the fourth outer circumference 314 are located in the area where the second surface 120 is located. Specially, the rotation of the rotating block 310 relative to the body 100 at this moment is similar to unfolding and folding of a folding fan.

In some embodiments, the camera 320 and the headset 330 both are arranged on the inner surface 315 of the rotating block 310. That is, the light entering surface of the camera 320 is located on the inner surface 315 and the sound outlet of the headset 330 is also located on the inner surface 315. When the rotating block 310 is rotated to the second position 102, a part of the inner surface 315 is located out of the area where the second surface 120 is located. That is, the part of the inner surface 315 is exposed out of the body 100 and is toward the first surface 110 of the body 100. The part of the outer surface 316 is not sheltered by the body 100 and the display screen 200. The sound outlet of the headset 330 located on the part of the inner surface 315 and the light entering surface of the camera 320 both are toward the first surface 110.

At this point, the camera 320 may shoot the scene located at one side of the display screen 200 and is also convenient for the human ear to contact the headset 330 to smoothly receive the sound signal of the mobile terminal 10.

As illustrated in FIG. 3, in some embodiments, during a process from the first position 101 to the second position 102, the light entering surface of the camera 320 is exposed from the second side circumference 132 to be out of the area where the second surface 120 is located. Sound outlet of the headset 330 is exposed from the third side circumference 133 to be out of the area where the second surface 120 is located. In brief, the camera 320 is exposed out from the side end of the mobile terminal 10 and the headset 330 is exposed out from the top end of the mobile terminal 10. When the rotating block 310 is driven using a manual manner, the user may apply an acting fore to the camera 320 or the headset 330. In this way, the convenience of operation on the rotating block 310 is improved.

At the second position 102, the headset 330 has a first projection on the inner surface 315 and the length direction of the first projection is the same as the width direction of the mobile terminal 10. The camera 320 has a second projection on the inner surface 315 and the length direction of the second projection is the same as that of the mobile terminal 10. In brief, the headset 330 is arranged transversely relative to the mobile terminal 10, and the camera 320 is arranged longitudinally relative to the mobile terminal 10. In this way, the headset 330 and the camera 320 are guaranteed not to generate a "skew" visual effect relative to the body 100 at the second position 102.

Figure 4:
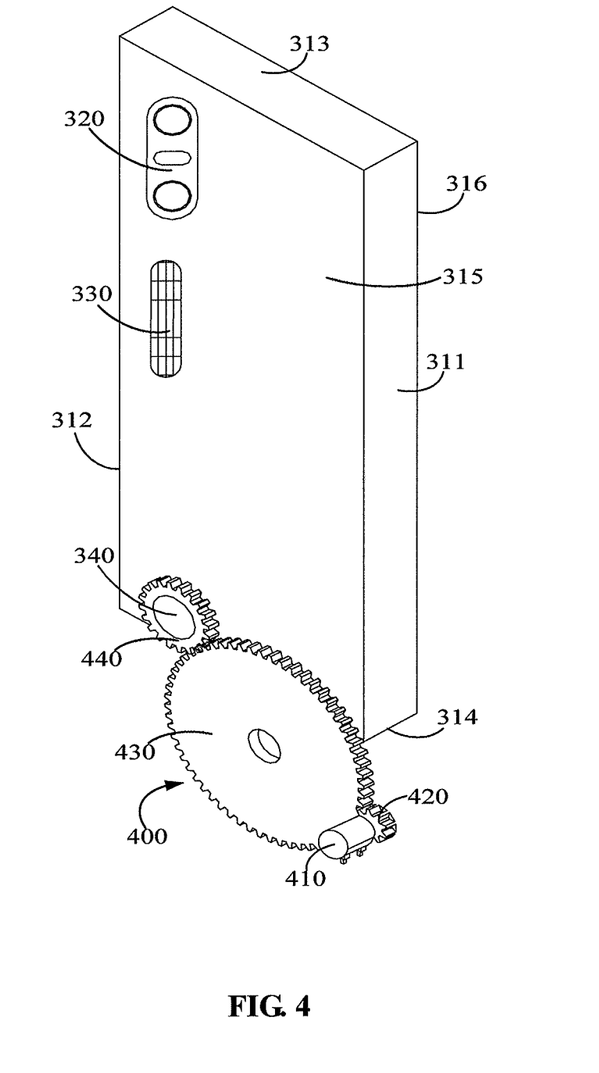
FIG. 4 illustrates a local structural schematic diagram of a mobile terminal provided by one embodiment.

As illustrated in FIG. 3 and FIG. 4, the functional assembly 300 further includes a rotating shaft 340. The rotating shaft 340 is rotatably connected with the body 100. For a rotating block 310 having a rounded rectangular or right-angled rectangular cross section, the rotating shaft 340 may be arranged at four corners of the rotating block 310, and junctions of the four outer circumferences are formed into the four corners of the rotating block 310. For example, the rotating shaft 340 is arranged at the junction of the second outer circumference 312 and the fourth outer circumference 314. Of course, the rotating shaft 340 may further be arranged at a geometric center of the rotating block 310, that is, located at the junction of two diagonal lines of the rotating block 310.

As illustrated in FIG. 3 and FIG. 4, the mobile terminal 10 further includes a drive piece 400. The drive piece 400 is arranged out of the functional assembly 300, so the size of the functional assembly 300 is not increased. For example, when the functional assembly 300 is rotated to the second position 102, no negative effect is caused to the appearance and vision of the mobile terminal 10 due to excessive large size exposed by the functional assembly 300. Meanwhile, the drive piece 400 is not rotated to be out of the second surface 120 with the functional assembly 300, so the energy consumption required to rotate the functional assembly 300 may also be saved. By adopting a gear meshed form to form transmission, a transfer path between the drive piece 400 and the functional assembly 300 may be shortened. Through controlling a space required to implement the rotation of the drive piece 400 and the functional assembly 300 as much as possible, the interference is prevented from causing to other components in the body 100 of the mobile terminal 10 to affect the installation and layout of the other components.

In some embodiments, the drive piece 400 includes a motor 410, a driving gear 420, a driven gear 440 and a transmission gear 430. The driven gear 440 is fixed on the rotating shaft 340. The driving gear 420 is fixed on an output shaft of the motor 410. The transmission gear 430 is in a meshed connection between the driving gear 420 and the driven gear 440. A transmission shaft of the transmission gear 430 may be arranged on a corresponding structure of the body 100. The motor 410 is fixed in the body 100. Through the rotation of the motor 410, the driving gear 420 sequentially drives the transmission gear 430 and the driven gear 440 to rotate, and thus the functional assembly 300 drives the camera 320 and/or the headset 330 to rotate to the second position 102 to expose out of the area where the second surface 120 is located.

The rotating shaft 340 of the functional assembly 300, the output shaft of the motor 410 and the transmission shaft of the transmission gear 430 are perpendicular to the display screen 200. Therefore, by virtue of gear transmission parallel to an axial direction, the rotation of the functional assembly 300 may be implemented. Such arrangement has the advantages of simple structure and high transmission efficiency.

The driving gear 420, the transmission gear 430 and the driven gear 440 are located in a same plane. Through arranging the driving gear 420, the transmission gear 430 and the driven gear 440 in the same plane, the size of each gear on the axial direction may be reduced, the thickness occupied by the functional assembly 300 and the drive piece 400 in a whole is relatively small and the size of the mobile terminal 10 is prevented from being increased.

In some embodiments, the diameter of the transmission gear 430 is greater than a sum of the diameters of the driving gear 420 and the driven gear 440. By increasing the area of the transmission gear 430, the area of the driving gear 420 on the motor 410 may be reduced, that is, the areas of the drive piece 400 and the functional assembly 300 in the rotating plane are reduced. As a result, the interference with the other components in the body 100 may be avoided and the space required by the other components does not need to be occupied, which is more beneficial to overall design, production and manufacturing of the mobile terminal 10.

As used herein, the term "Terminal" includes, but not limited to, a device configured to connect via a wired circuit (for example, via a Public Switched Telephone Network (PSTN), a Digital Subscriber Line (DSL), a digital cable, a direct cable connection and/or another data connection/network) and/or receive/send a communication signal via a wireless interface of (for example, a cellular network, a Wireless Local Area Network (WLAN), a digital television network such as a (Digital Video Broadcasting-Handheld (DVB-H) network, a satellite network, an AM-FM broad transmission equipment and/or another communication terminal). The communication terminal configured to communicate via a wireless interface may be referred to as a "wireless communication terminal", a "wireless terminal" and/or a "mobile terminal". Examples of the mobile terminal include, but not limited to, a satellite or cellular telephone, a Personal Communication System (PCS) terminal capable of combining with a cellular wireless telephone and data processing, faxing and data communication abilities, a Personal Digital Assistant (PDA) that may include a radio telephone, a pager, an internet/intranet access, a Web browser, a memo pad, a calendar and/or a Global Position System (GPS) receiver, and a conventional laptop and/or palmtop receiver or other electronic devices comprising a radio telephone receiver.

Each technical characteristic of the above embodiments may be combined freely. To describe briefly, all possible combinations for the each technical characteristic of the above embodiments are not described. However, as long as there is no conflict among the combinations of the technical characteristics, all should be considered as a scope recorded by the specification.

The above embodiments only express several implementation manners of the disclosure, and the description is specific and detail but cannot be understood as the limit to the scope of the disclosure. It is to be noted that, those of ordinary skill in the art may further make several variations and improvements without departing from the concept of the disclosure and all pertain to the scope of protection of the disclosure. Accordingly, the scope of protection of the disclosure should be subject to the appended claims.

The invention claimed is:

1. A mobile terminal, comprising:
a body, comprising a first surface and a second surface arranged opposite to the first surface;
a display screen, arranged on the body and located at one side of the first surface; and
a functional assembly, comprising a rotating block rotatably arranged on the second surface, a telephone receiver and a camera, the telephone receiver and the camera being located on the rotating block, the rotating block comprising an inner surface, an outer surface, and an outer circumference connected between the inner surface and the outer surface, the inner surface being closer to the second surface relative to the outer surface,
wherein
the rotating block is capable of being rotated through a first position and a second position relative to the body;
the camera is provided with a light entering surface;
when the rotating block is at the first position, a periphery of the rotating block is aligned with a periphery of the body, and the light entering surface is located in positive projection areas of both the display screen and the body on a rotating plane of the rotating block so as to be sheltered by the body and the display screen; and
when the rotating block rotates from the first position by an angle less than 90 degrees to the second position, edges of the rotating block are staggered with edges of the body, and the light entering surface and the telephone receiver are located out of the positive projection areas of both the display screen and the body on the rotating plane of the rotating block so as to be exposed out of the body;
wherein the telephone receiver has a first projection on the inner surface, and the camera has a second projection on the inner surface; and only when the rotating block is at the second position, a length direction of the first projection is the same as a width direction of the mobile terminal, and a length direction of the second projection is the same as a length direction of the mobile terminal.

2. The mobile terminal of claim 1, wherein a thickness of the rotating block is smaller than or equal to a thickness of the body.

3. The mobile terminal of claim 1, wherein the body further comprises a side circumference connected between the first surface and the second surface; the side circumference comprises a first side circumference, a second side circumference arranged in parallel to the first side circumference, as well as a third side circumference and a fourth side circumference arranged in parallel to the third side circumference; the third side circumference is connected with an end of each of the first side circumference and the second side circumference, and the fourth side circumference is connected with another end of each of the first side circumference and the second side circumference; a length of the first side circumference is greater than a length of the third side circumference; and when the rotating block is from the first position to the second position, the camera is exposed from the first side circumference or the second side circumference to be out of an area where the second surface is located.

4. The mobile terminal of claim 3, wherein the outer circumference comprises a first outer circumference, a second outer circumference, a third outer circumference and a fourth outer circumference connected in a closed loop; when the rotating block is at the first position, the outer circumference is aligned with the side circumference; and when the rotating block is at the second position, the outer circumference is staggered with the side circumference, the first outer circumference and the fourth outer circumference both are located out of the area where the second surface is located, and a part of the second outer circumference and all of the third outer circumference are located in the area where the second surface is located.

5. The mobile terminal of claim 4, wherein the light entering surface of the camera is located on the inner surface.

6. The mobile terminal of claim 4, wherein telephone receiver has a sound outlet located on the inner surface; and when the rotating block is from the first position to the second position, the sound outlet of the telephone receiver is exposed from the third side circumference to be out of the area where the second surface is located.

7. The mobile terminal of claim 1, wherein the functional assembly further comprises a rotating shaft rotatably connected with the body; the rotating shaft is arranged at a corner of the rotating block; or the rotating shaft is arranged at a geometric center of the rotating block.

8. The mobile terminal of claim 7, further comprising a drive piece capable of driving the rotating block to move, wherein the drive piece comprises a motor, a driving gear, a transmission gear and a driven gear; the motor is mounted on the body; the driving gear is fixed on an output shaft of the motor; the driven gear is fixed on the rotating shaft; and the transmission gear is connected between the driving gear and the driven gear in a meshed manner.

9. The mobile terminal of claim 7, wherein the rotating shaft of the functional assembly, the output shaft of the motor, and a transmission shaft of the transmission gear are perpendicular to the display screen.

10. The mobile terminal of claim 7, wherein the driving gear, the transmission gear and the driven gear are located on a same plane.

11. The mobile terminal of claim 7, wherein a diameter of the transmission gear is greater than a sum of diameters of the driving gear and the driven gear.

* * * * *